Jan. 4, 1966 R. I. GRAY 3,227,974

RADIO-FREQUENCY INTERFERENCE GUARD IN FORM OF LOW-PASS FILTER

Filed Dec. 29, 1961 3 Sheets-Sheet 1

INVENTOR
REGINALD I. GRAY

BY O. Baxter Warner
Claude Funkhouser
ATTORNEYS

Jan. 4, 1966 R. I. GRAY 3,227,974
RADIO-FREQUENCY INTERFERENCE GUARD IN FORM OF LOW-PASS FILTER
Filed Dec. 29, 1961 3 Sheets-Sheet 3

United States Patent Office 3,227,974

Patented Jan. 4, 1966

3,227,974

RADIO-FREQUENCY INTERFERENCE GUARD IN FORM OF LOW-PASS FILTER

Reginald Irvan Gray, Dahlgren, Va., assignor to the Minister of Aviation in Her Majesty's Government of the United Kingdom of Great Britain and Northern Ireland, London, England Filed Dec. 29, 1961, Ser. No. 163,162
9 Claims. (Cl. 333—79)

The present invention relates to a miniature low-pass attenuator, and more particularly to a radio-frequency interference guard for reducing to a negligible level the radio-frequency power transmitted at a frequency in the attenuation band.

The instant invention solves the serious problem of damage caused by spurious energies induced in electronic circuits by electromagnetic and electrostatic fields. When used in any compatible electrical or electronic circuit it reduces to a negligible level the radio-frequency power transmitted at a frequency in the attenuation band without appreciably attenuating direct current and low frequencies in the pass band. This solution is particularly important for providing adeguate protection to weapon electroexplosive devices against electromagnetic and electrostatic fields.

It has been the practice to attempt to solve this problem by the use of low-pass non-dissipative electric filters, broad-band attenuators and lossy transmission lines, or low-pass dissipative electric filters.

The elimination of hazards of electromagnetic radiation to ordnance requires protection at all frequencies above a nominal frequency in the region of 10 to 100 kilocycles. Further, the impedance of the spurious electromagnetic generators may have any value from a few tens of ohms to megohms and will generally be complex.

Low-pass non-dissipative electric filters generally comprise a combination of inductances and capacitors, usually in the form of ladder networks of $\pi$ or T sections. The performance of these filters depends upon their ability to cause appreciable impedance mismatch between generators and loads of specified impedances thereby resulting in purely reflective attenuation. These filters are unacceptable for solving the problem of electromagnetic radiation hazards to ordnance because the generator impedance cannot be specified. At some particular frequencies the filter impedance may therefore be matched by its conjugate impedance and the filter becomes a matching section causing all the available power to be dissipated into the load, or into the weapon electroexplosive device.

Attenuators contain resistive, dissipative, elements in various combinations of series and/or parallel configurations with the normal design requirement being the broadest possible bandwidth downward to direct current. Distributed equivalent circuits take the form of transmission lines the materials of which produce series and/or parallel losses. Broad-band attenuators are also non-acceptable for the protection of weapon electroexplosive devices because low-pass characteristics are essential. Broad-band desensitization of the system could be achieved much more simply by desensitizing the load; or electroexplosive device, but this is not a solution where preferential attenuation is required. Transmission lines which possess low-pass characteristics and adequate high-frequency attenuation could offer a solution, but no satisfactory transmission lines having these characteristics are presently available.

Low-pass dissipative electric filters are, intentionally or unintentionally, a combination of low-pass non-dissipative electric filters and attenuators in which the inductances and capacitors have appreciable loss at high frequencies or in which series and/or parallel resistive elements have been included. These low-pass dissipative electric filters can provide a partial solution to the protection of electroexplosive devices if used under closely controlled conditions. For example, a filter that provides real attenuation at a particular frequency into a low impedance load by the use of a series lossy element, such as a ferrite choke, in which loss is proportional to load current may give a real gain into a high impedance load. Furthermore, at some frequencies any filter may exhibit band-pass effects and may give a net insertion gain if the reflective insertion gain is greater than the dissipative insertion loss.

Conventional lumped circuit filters and attenuators are generally considered unacceptable for the provision of adequate protection against spurious energies induced by electromagnetic and electrostatic fields. Since there is no inherent difference in the design of a loss-less filter and a matching section, that is, they are both impedance transformers, the attenuation or gain achieved by their use is a unique function of the system in which they are used comprising a generator, a filter/matching section, and a load. Further, the roles of these devices may be interchanged at critical combinations of frequency, generator and load impedances. The foregoing is particularly important in the protection of electroexplosive devices where one is concerned with the Thevenin equivalent generator impedance at the input to the filter. Furthermore, additional band-pass effects often arise in filters as a result of the changes in component impedance with frequency. That is, capacitors often become inductive at certain frequencies, inductances are reduced by self-capitance effects, and resistors increase their values and become reactive.

The instant application accomplishes the reduction of RF power to a negligible level in the attenuation band while passing D.C. and low frequencies in the pass-band without appreciable attenuation. This is accomplished by causing all incident energies to pass through the wall of an elongated tube of required wall thickness thereby achieving a sufficiently high shunt D.C. resistance to enable firing to occur with reasonably low currents while employing the intrinsic low-pass characteristics of a metal barrier for filtering out harmful energies.

Accordingly, it is an object of the present invention to provide interference protection against spurious energies induced by electromagnetic and electrostatic fields.

Another object is to provide an attenuator capable of attenuating equally both the electric component and the magnetic component of a field.

A further object of the invention is the provision of a low-pass attenuator which eliminates electrostatic hazards by completing an electrostatic shield around the load and, by providing a low resistance path across the pair of firing circuit wires, prevents the build-up of electrostatic charges in the circuit.

Still another object is to provide a radio-frequency interference guard employing the intrinsic low-pass characteristics of a metal barrier in filtering out harmful energies.

Yet another object of the present invention is the provision of a low-pass interference guard which is capable of employing reflective attenuation in the dissipative attenuation band in order to increase the probability of protecting itself against overheating by RF sources.

A still further object is the provision of a low-pass interference guard which does not rely on reflective attenuation for its low-pass performance characteristic and which cannot, therefore, be rendered non-effective by matching to the generator but employs reflective attenuation in the dissipative attenuation band.

A yet further object of the invention is the provision of a miniature low-pass attenuator capable of reducing RF energy in the attenuation band without appreciably attenuating D.C. and low frequencies in the pass band.

Yet a still further object of the invention is to provide a radio-frequency interference guard for achieving protection of weapon electroexplosive devices against spurious energies induced in their associated circuits by electromagnetic and electrostatic fields.

Other objects and many of the attendant advantages of this invention will be readily appreciated as the same becomes better understood by reference to the following detailed description when considered in connection with the accompanying drawings wherein.

Figures 2, 3, 4, 5, 6, 7:
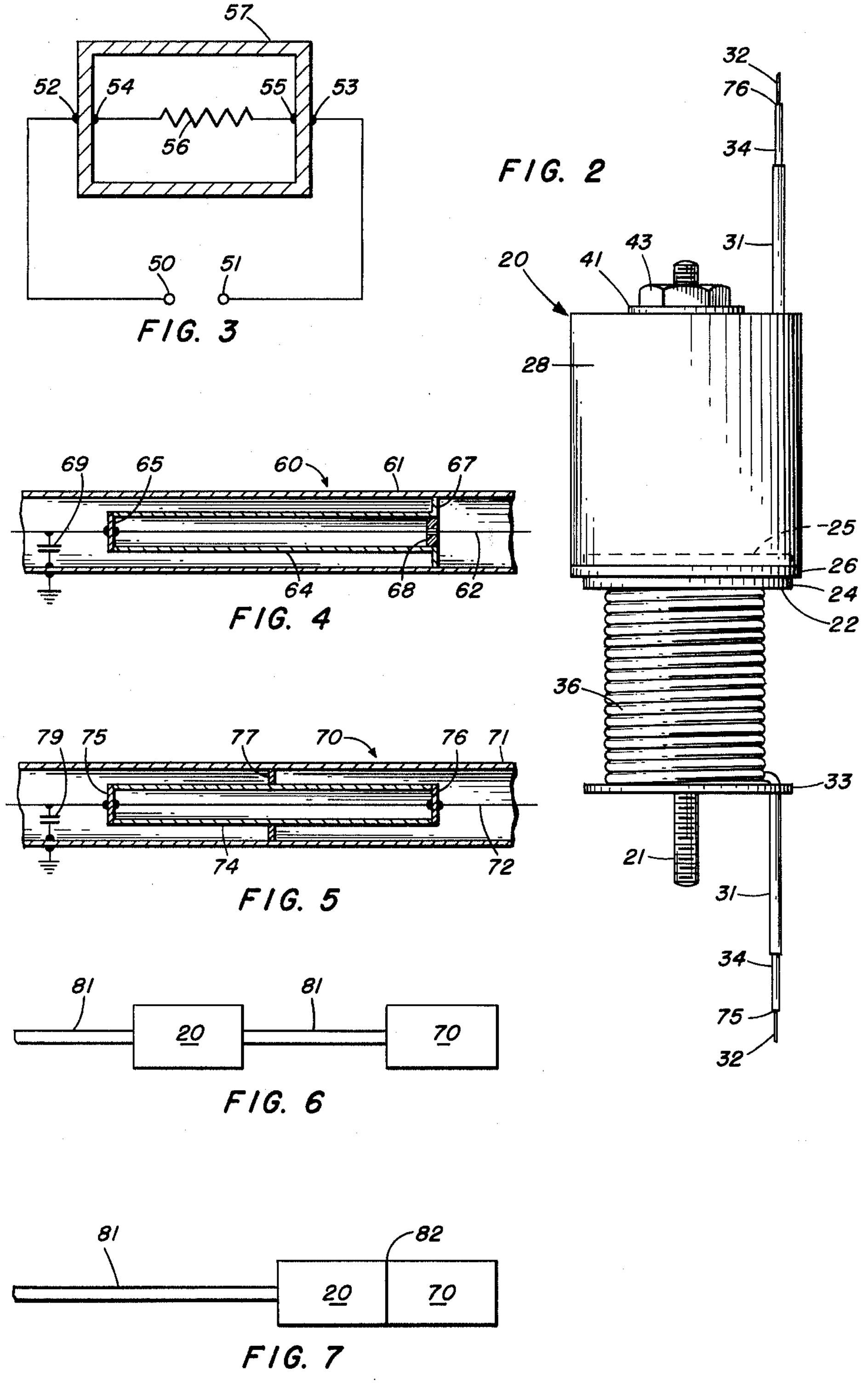
FIG. 2 is a side elevation of the invention, partially assembled, of the embodiment illustrated in FIG. 1.
FIG. 3 is a schematic drawing of an idealized concept for achieving the purpose of the invention.
FIG. 4 is a schematic side elevation of another embodiment of the invention.
FIG. 5 is a schematic side elevation of the embodiment of FIG. 1.
FIG. 6 is a schematic diagram of the radio-frequency interference guard of the invention inter-connected with an electroexplosive device.
FIG. 7 is a schematic diagram of another manner of interconnecting the radio-frequency interference guard of the instant invention with an electroexplosive device.

FIGS. 10, 11, 12, and 13 are schematic side elevations of alternative constructions of a portion of the radio frequency interference guards as illustrated in FIGS. 4 and 5.

Figure 1:
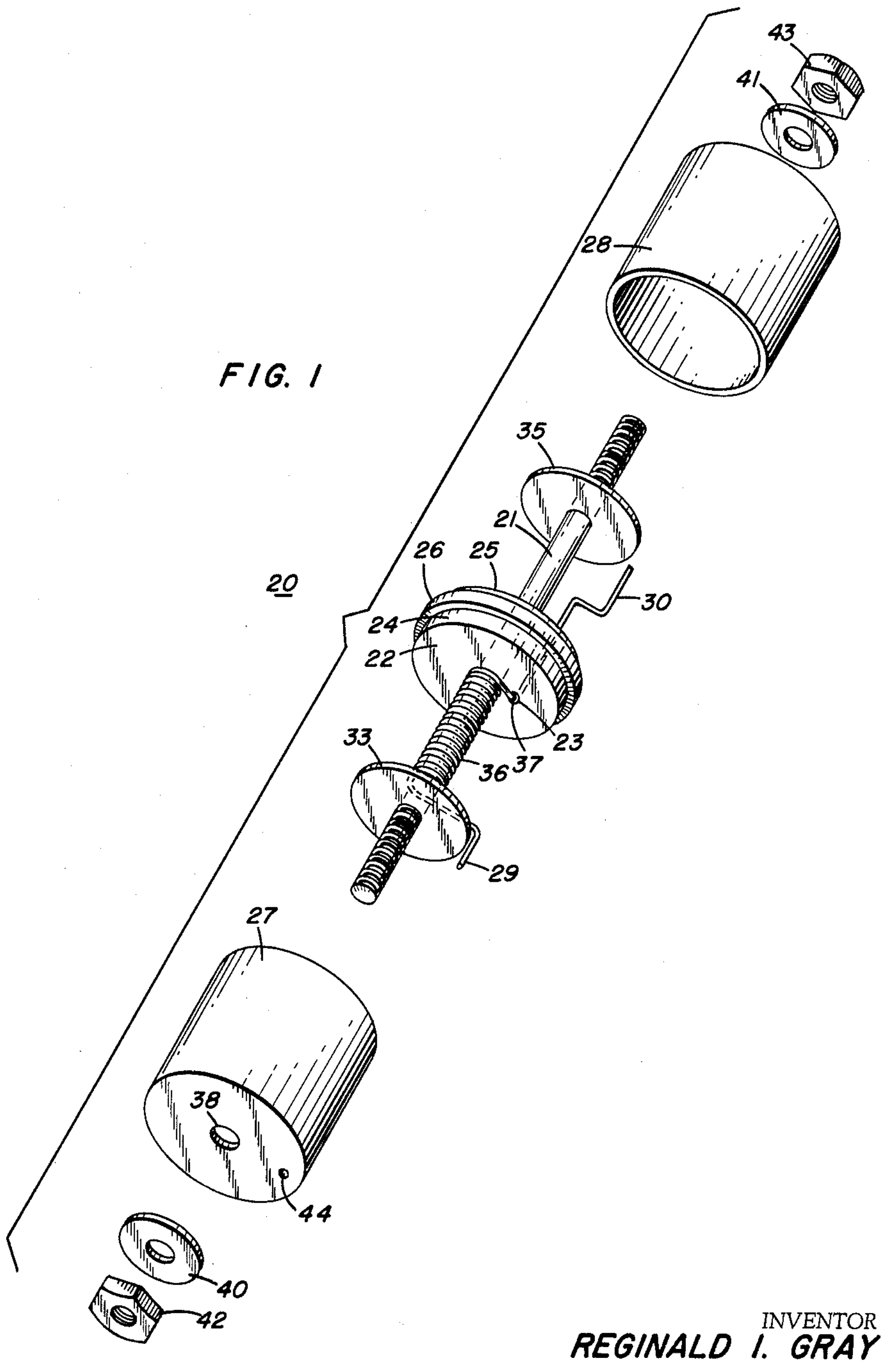
FIG. 1 is an exploded perspective view of an embodiment of the invention.

Referring now to the drawings wherein like reference characters designate like or corresponding parts throughout the several views, there is shown in FIG. 1 and FIG. 2 an exploded view of a radio-frequency interference guard 20 shown partially assembled in FIG. 2. The main longitudinal support of the radio-frequency interference guard is a center spindle 21 to the center of which is brazed or otherwise suitably connected a metal disc 22. For purpose of example disc 22 may be approximately $\frac{3}{32}$″ wide. On the spindle 21 is wound a coaxial line having an inner conductor 32 (see FIG. 2) and an outer conductor of high purity iron tubing 34 (FIG. 2). The coaxial line is short circuited and sealed off at points 75 and 76 (FIG. 2) by soldering and from this point onwards, the outer conductor has an outer shealth 31 (FIG. 2) which may be any suitable insulator such as Teflon. In the preferred embodiments of FIGS. 1 and 2, however, the insulator sheath 31 (FIG. 2) does not completely enclose the iron tubing. As will be discussed below, the iron tubing is electrically connected to the disc 22 at the aperture 23 via a collar 37. In order to allow this connection, the insulation is placed upon the tubing 34 in two equal length sections, each abutting an opposite side of the collar 37.

The inner conductor 32 (FIG. 2), for purpose of example, could be a nylon covered copper wire having a diameter of 0.005 inch. The outer conductor, for purposes of example, could be six feet long and have a nominal outer diameter of 0.012 inch and a wall thickness of 0.001 inch. The exterior of the coaxial line which is to be wound on, and within, the radio-frequency interference guard should be suitably enameled to provide D.C. insulation.

The disc 22 has an aperture 23 therein so that the coaxial line will be threaded therethrough and so that the half portions 29 and 30 of the coaxial line extend on each side of disc 22. Prior, however, to constructing the coaxial line and to threading the coaxial line through aperture 23 for winding it upon spindle 21, a small brass collar 37 is soldered or otherwise suitably connected externally but to the linear center of the iron tube 34. The brass collar 37 has an internal diameter approximately the same as the outer diameter of the tube 34 (FIG. 2) and an outer diameter which will cause an interference fit when pressed into aperture 23 of disc 22. Disc 22 and collar 37 should be of brass or of other suitable material to achieve satisfactory shielding between the two sides of the radio-frequency interference guard 20. The disc 22 and collar 37 should also be silver plated so as to provide a good conductive connection to the tube 34, and to caps 27 and 28.

When the coaxial line is fixely held by the insertion of collar 37 into aperture 23 of disc 22, it is wound, as at 36, on the spindle 21 between disc 22 and the retaining discs 33 and 35. With a coaxial line of the dimensions set forth by example above there would be required approximately four layers of line on each side of disc 22 where the retaining discs 33 and 35 are approximately 0.75 inch apart.

After the coaxial line has been wound on spindle 21 and suitably secured the silver plated brass caps 27 and 28 are inserted over opposite ends of the spindle 21 through central apertures 38 in the end plates of these caps. The caps 27 and 28 have an outer diameter approximately equal to the diameter of the central portion 26 of disc 22 so as to communicate therewith and also an inner diameter slightly larger than the outer diameters of portions 24 and 25 of disc 22. Thus, the caps 27 and 28 may be inserted on the spindle so as to have the end plates thereof juxtaposed respectively to the retaining discs 33 and 35 and to have the opposite extremities of the caps fit into the L-shaped grooves provided by maintaining central portion 26 of disc 22 with a larger diameter than the outer portions 24 and 25. Thus, the caps 27 and 28 coact with disc 22 to form a shell which provides an outer shield for the invention and protection for the coiled iron tube 36. Further, each of the caps 27 and 28 have apertures 44 at the periphery of the end plates thereof. Thus, after suitable insulation 31, such as Teflon, is provided outwardly from points 75 and 76, where the windings terminate, for suitably insulating the input and output, the leads will be brought out through apertures 44. Thereafter, washers 40 and 41 and nuts 42 and 43 will be placed upon the suitably threaded end portions of spindle 21 for completion of the radio-frequency interference guard 20. It should be understood that the radio-frequency interference guard of FIGURES 1 and 2 is "potted." Further, a lead-through capacitor such as capacitor 79 of FIG. 5, would be connected across the input of the embodiments of FIGS. 1 and 2 as in FIG. 5, that is, from the input center conductor 32 (FIG. 2) to the outer shield 27–28. The function of this capacitor will be explained below.

The instant invention is based on the idealized concept of enclosing the electrical load within a continuous electromagnetic shield of suitable metal and thickness to provide adequate protection against all radio-frequency and electrostatic fields. While the protection against very low frequency magnetic fields is impractical because of the prohibitive thickness of metal required, such protection can be obtained indirectly by the use of balanced circuits which tend to cancel out induced emfs.

This idealized concept as illustrated in FIG. 3 employs an electrical load 56 which is energized intentionally across terminals 50 and 51 to cause a potential difference between points 52 and 53 on the exterior of the completely sealed pure iron box 57. For D.C. in steady state a potential difference is set up internally between points 54 and 55, which is substantially equal to the external potential difference between points 52 and 53. Low frequency excitation is also possible and hence a D.C. step function will pass, with small attenuation, all but its high frequency components. Power frequencies, such as 60 cycles per second or 400 cycles per second may be employed for energizing the load, without serious loss.

The attenuation through the metallic barrier is governed by the real part ($\alpha$) of the propagation function ($\gamma$):

$$\gamma=\alpha+j\beta\simeq(1+j)\sqrt{\frac{\omega\mu\sigma}{2}} \quad (1)$$

where $\alpha$=attenuation function (neper/meter)
$\beta$=phase function (radian/meter)
$\mu$=initial permeability (henry/meter)
$\sigma$=conductivity (mho/meter)
$\omega=2\pi$ frequency in cycles per second from which is derived the equation for "skin depth"

$$\delta=\frac{1}{\alpha}=\frac{1}{\beta}=\sqrt{\frac{2}{\omega\mu\sigma}} \quad (2)$$

meters/neper or radian which is the distance at which both the electric field (E) and the magnetic field (H) as well as the current density (J), are attenuated to a value of $e^{-1}$ of their respective magnitudes at the surface. Clearly, from Equations 1 and 2, it is also the distance at which the phase is retarded by one radian.

As noted above, the attenuation through the device of FIG. 3 from 52 to 53, for example, is governed by the real part of the propagation function, the attenuation function:

$$\alpha=Re\gamma\simeq\sqrt{\frac{\omega\mu\sigma}{2}}$$

nepers/meter
From this expression, the dependence in the instant invention of the attenuation function only upon frequency for given materials can be shown:

$$\alpha\simeq\sqrt{2\pi f\mu\sigma/2}$$

$$\simeq\sqrt{\pi\mu\sigma}\sqrt{f}$$

$$\therefore\ \alpha\simeq K\sqrt{f}$$

nepers/meter, where $\mu\sigma$ is determined by the metal used for the box 57 and $f$ is the frequency of the signal in cycles per second.

Since the material which gives maximum attenuation per unit volume is pure iron because of the fact that it has the highest $\mu\sigma$ product up to about $10^{10}$ cycles per second, the sealed box 57 will be normally made from iron.

Basically, there are several reasons why it is undesirable, however, in practice to place the load 56 inside of a box, as shown in FIG. 3. First, the attenuation process is associated with a loss wave which penetrates into the metal and causes heating. Since it is undesirable to have a heat source in close proximity to primary explosives, where the radio-frequency interference guard will be used to protect weapon electroexplosive devices, such an embodiment is non-acceptable. Secondly, in order to achieve a sufficiently high shunt D.C. resistance to enable firing to occur with reasonably low currents, it is necessary to make the "box" in the form of a small diameter tube. The increase of resistance by the use of high resistivity material is not acceptable because its use defeats the prime requirement for high attenuation which is a high value of $\sigma$ as seen in Equation 1. Similarly, decreasing the wall thickness in order to give a high resistance and a short length is also not acceptable since D.C. resistance is inversely proportional to wall thickness ($t$) where RF attenuation is an exponential function $e^{-\alpha t}$. The correct solution, therefore, is based upon use of the longest possible tube with the required wall thickness.

Applying, then, the above discussion to the instant invention, its operation may be substantially explained as follows: Reference will be made to FIG. 2. If a D.C. or low frequency A.C. signal is applied to the inner conductor 32, it will be passed through the device 20 mainly by conductor 32 with little or no attenuation. As the frequency of the input rises, however, the signal will begin to flow through the outer conductor 34, which is shorted to the inner conductor 32 at points near the input and output 75 and 76. This phenomenon may be considered in the final analysis as the skin effect. This effect serves to increase the effective impedance of the outer conductor 34. The expression given above for skin depth fixes the approximate wall thickness of the outer conductor 34.

It may be seen, then, that as the frequency of the input rises past a certain point, the density of current near the surface of the outer conductor also rises. This results in an increase in the impedance seen by the signal and, therefore, an increased attenuation of the signal.

The coaxial line is wound upon a spindle 21 in order to conserve space and enclosed in a brass container 27, 22, 28. The brass acts as a magnetic shield, and serves to prevent radiation of a radio frequency magnetic field from the device. That is, the varying field tends to displace electrons in the shield at the particular frequency at which the field is varying. This action generates small magnetic whirls, or eddy currents, which produce their own magnetic fields. These small fields, by Lenz's law, oppose the main field and cancel it out at the brass barrier.

In order to obtain the longest possible tube with the required wall thickness, the attenuator would, therefore, take the form shown schematically in FIG. 4. FIG. 4 illustrates a single element radio-frequency interference guard 60 which is similar to the embodiments of FIGS. 1 and 2 except that only one winding compartment is employed, rather than two, causing the disc 22 and the collar 37 to be replaced by an end cap portion of the outer shield 67 which contains an insulated bush 68 through which the inner wire passes. The outer shield of the single element radio-frequency interference guard is schematically illustrated as 61 while the input wire or inner conductor 62 joins and is soldered to the iron tube 64 at point 65. The iron tube is connected to the outer shield by a ring such as the brass disc 22 and collar 37 of FIGS. 1 and 2. A lead-through or anti-resonance capacitor 69 is connected across the input, that is, the capacitor is connected between the inner conductor of the coaxial line and the outer shield.

FIGS. 1 and 2 and the schematic FIG. 5 of a double element of a radio-frequency interference guard consists essentially of two of the single elements of FIG. 4 connected back to back and lends itself to easier construction while producing more than twice the attenuation of the single element. As in FIG. 4 the double element embodiment of FIG. 5 has an outer shield 71 of the radio-frequency interference guard the inner conductor 72 and the iron tube 74 short circuited by solder to the inner conductor 72 at points 75 and 76. A lead-through capacitor 79 is also employed in the double element 70 as is the connection of disc 77 which is equivalent to the disc 22 and the collar 37 of FIGS. 1 and 2. The instant invention, therefore, sets forth a radio-frequency interference guard 20 as a separate unit which may be connected independently through well shielded interconnections 81 to an electroexplosive device 80 as in FIG. 6. As best seen in FIG. 7 the radio-frequency interference guard may also, however, be connected as an adapter unit directly to the electroexplosive device 80 where satisfactory thermal insulation 82 is maintained between the radio-frequency interference guard and the electroexplosive device.

Figure 8:
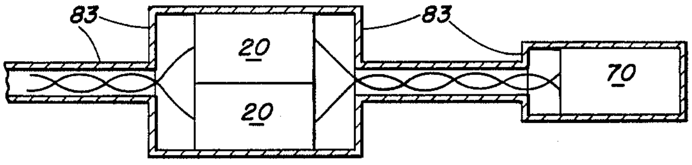
FIG. 8 is a schematic diagram of the inter-connection of the radio-frequency interference guard of FIG. 5 with an electroexplosive device.
Figure 9:
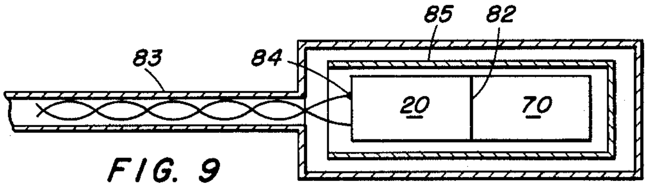
FIG. 9 is a schematic diagram of another manner of interconnecting the radio-frequency interference guard of FIG. 4 with an electroexplosive device.

For balanced two-wire systems a double element unit or two separate units would be required to satisfactorily protect the weapon electroexplosive device from the spurious energies induced by electromagnetic and electrostatic fields without unbalancing the circuit. That is, as illustrated in FIG. 8, two radio-frequency interference guards 20 may be maintained within one container if shielded properly by shielding 83 and connected to the electro-explosive device 80. A satisfactory compromise, however, may be seen in FIG. 9 wherein the radio-frequency interference guard 20 is connected directly to the electro-explosive device 80 with one wire attached to the case of the radio-frequency guard 20 at point 84. Of course, satisfactory shielding 83 would be required and an insulating barrier 85 would be necessary between the shielding 83 and the assembly of the radio-frequency interference guard 20 and the electroexplosive device 80. Further, thermal insulation 82 would be required between the radio-frequency interference guard and electroexplosive device as set forth in FIG. 7.

There is yet another requirement for a protective device such as the instant invention. Since it is impossible to pre-specify the maximum available RF power against which protection is or will be required, the usefulness of any device depends on the power handling capacity of the input element to the device. This raises the problem of reliability and possibility of safety. Power limiting devices may be used but they may also inhibit the device device in the pass-band when normal functioning is required in the presence of spurious RF fields. To minimize this problem is is, therefore, necessary to arrange for the real part of the input impedance to fall to a negligible value in the attenuation band. The instant application offers this capability since above the frequency where a metal is several skin depths thick it becomes equivalent to an infinitely thick sheet. Above cut-off frequency, that is in the attenuation band, the surface impedance of the metal becomes:

$$Z=R+jX\simeq(1+j)\sqrt{\frac{\omega\mu}{2\sigma}} \tag{4}$$

ohms per square where R is the real part and X is the inductive part of the impedance, and Z is the ratio of tangential components of E and H, the electric and magnetic fields. In this frequency band the iron tube "looks" like a solid wire to externally incident waves and the total RF impedance of the tube, allowing for the self-inductance caused by coiling, increases as the square root of the frequency. Since both the reactance and the resistance increase as the square root of $f$ the Q of the arrangement tends to a constant value.

A two-fold advantage can be achieved if a good quality capacitor is connected across the input of such a value that anti-resonance frequency occurs within the pass-band. Such a capacitor is set forth in FIGS. 4 and 5 as being capacitors 69 and 79, respectively. First, the transposed real part at anti-resonance will be appreciably greater than the true resistance. Second, the input impedance to the device will be capacitive in the attenuation band and the transformed real part of this impedance will fall rapidly to a very small value. The rate of decrease is the combined effect of the falling reactance of the capacitor and the rising A.C. resistance and inductance of the tube. This effect is increased by the increased inductance of the coiled tube.

The input impedance of such a combination is:

$$Z=\omega^{1/2}\frac{\{\gamma-j[\omega^{3/2}C(\gamma^2+x^2)-x]\}}{(1-\omega^{3/2}xC)^2+(\omega^{3/2}\gamma C)^2} \tag{5}$$

where $C=$ parallel capacity $\gamma=$ the real part of Z $x=$ the imaginary part of Z $Z=(\gamma+jx)\omega^{1/2}$ is the input impedance of the radio-frequency interference guard and $x>\gamma$ because of coiling of the tube.

Anti-resonance occurs at $\omega_0$ where $$\omega_0=\left[\frac{x}{(\gamma^2+x^2)C}\right]^{2/3} \tag{6}$$

and for frequencies $\omega>\omega_0$ the imaginary part is negative: The real part is $$ReZ=\frac{R}{1+\omega^3C^2(\gamma^2+x^2)-2\omega^{3/2}xC} \tag{7}$$

where R is the A.C. resistance of the radio-frequency interference guard. At anti-resonance:

$$ReZ=R\left[1+\left(\frac{x}{\gamma}\right)^2\right]$$

which is greater than R, $ReZ=R$ when $\omega=\omega_1$ ($\omega_1$ being that frequency which causes the denominator of Equation 7 to become unity and then $$\omega_1{}^3C^2(\gamma^2+x^2)=2\omega_1{}^{3/2}xC\ \therefore\ \omega_1=2\left[\frac{x}{(\gamma^2+x^2)}\right]^{2/3}=2\omega_0$$

For high frequencies such that $$(\omega^{3/2})^2\gg\omega^{3/2}ReZ\simeq\frac{R}{1+\omega^3C^2(\gamma^2+x^2)}\simeq\frac{1}{\omega^{5/2}C^2\left(\gamma+\frac{x^2}{\gamma}\right)}$$

Although, theoretically, it is still possible to match a generator of the correct conjugate impedence into this at any frequency, the probability of obtaining a Thevenin equivalent generator impedence at the terminals of the radio-frequency interference guard of the instant invention with a real part equal to $Re$ Z rapidly decreases with increasing frequency until it may be considered negligible. Protection of the device against overheating in this zone then depends upon reflective attenuation.

Figure 10:
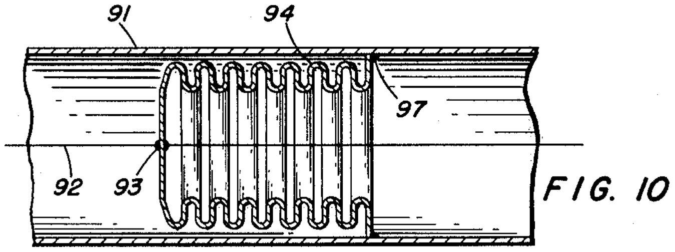
Figure 11:
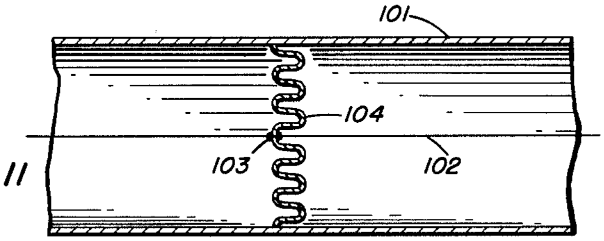
Figure 12:
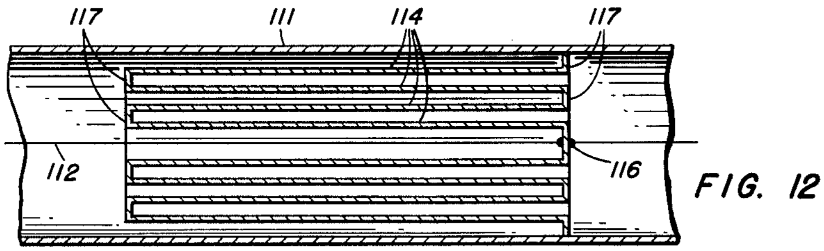
Figure 13:
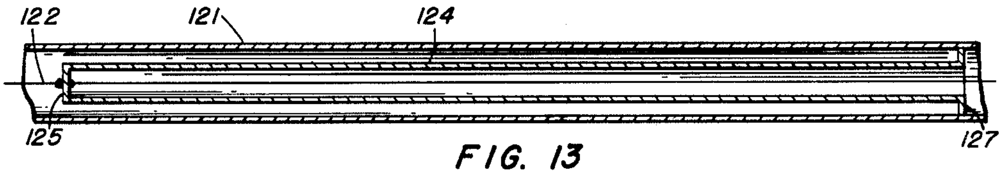

While, as previously mentioned, to increase D.C. resistance by decreasing thickness, through perforation, or the use of a metal of high resistivity defeats the primary object, high D.C. resistance can be obtained by alternative constructions. FIGS. 10, 11, 12, and 13 are such alternative constructions for increasing the D.C. resistance of the shielding enclosure or membrane and accomplish this by essentially increasing the length of the barrier. FIG. 10 illustrates corrugation of the iron tube 94 throughout its length to form a bellows like tubing, and the soldered connection 93 of the inner conductor 92 and the iron tube 94. At the other end the tube is joined to the outer shield 91 at 97, as in previous embodiments. FIG. 11 sets forth the use of a corrugated disc barrier 104 maintained between the outer shield 101 of the radio-frequency interference guard and the inner conductor 102. FIG. 12 illustrates the use of a plurality of concentric tubes 114 interconnected by annular spacers 117 of the same metal. The inner conductor is soldered at 116. This, of course, causes a very long path from the inner conductor connection point 116 to the connection at the outer shield 111. FIG. 13 illustrates the simple use of a very long, straight coaxial line which when the inner conductor 122 is short circuited to an iron tube 124 at point 125 and connected after an extended length to the outer shield 121 by a disc at 127 causes a very long path.

The advantages of the use of the instant invention are numerous. It achieves far higher dissipative attenuation in the attenuation band than any other known device of comparable dimensions yet produced and its attenuation in the pass-band is satisfactorily low and substantially constant. The instant attenuator is essentially a low-pass power device in that it attenuates equally both the electric component and the magnetic component of the field and has a cut-off frequency, the frequency for half power, which can readily be adjusted to any required value by selecting the appropriate tube thickness. All other parameters are easily controlled and the size of the instant invention is determined mainly by the D.C. requirements and by the considerations of power handling. The slope of the attenuation/frequency curve of the instant invention tends, by definition, to be $$\frac{db}{\sqrt{f}} = \text{constant}$$

in the attenuation band up to approximately $10^{10}$ cycles per second where the initial permeability of iron falls to that of non-ferromagnetic metals, which is also the free space permeability. Because of the extremely high attenuation obtained at this frequency the reduction in permeability is unimportant. This attenuation characteristics is based on established physical laws which have been verified up to 0.01 millimeter wavelength and are believed to apply at even shorter wavelengths. The attenuation band response can therefore be computed once the constant has been determined experimentally at low frequencies. Further, the shape of the attenuation/frequency characteristic is largely independent of the terminating impedence, particularly in the attenuation band. The instant invention is, however, constituted primarily for low impedance loads.

The instant invention is further advantageous since it does not suffer from the spurious band-pass and resonant phenomena of conventional lump component filters. Additionally, unlike conventional dissipative filters, this device does not rely on reflective attenuation for its low-pass performance characteristics and it cannot, therefore, be rendered non-effective by matching to the generator. It does, however, employ reflective attenuation in the dissipative attenuation band in order to increase the probability of protecting itself against over-heating by RF sources. The attenuator comprising the present invention also achieves the elimination of the electrostatic hazard by completing the electrostatic shield around the load and, by providing a low resistance path across the pair of firing circuit wires, prevents the build-up of electrostatic charges in the circuit.

In summary, this invention is based on and derived from Maxwell's equations but embodies a new application of these laws. The current use of thick metal barriers is confined to shielding applications. On the other hand, very thin deposited metal films are used as resistive elements for high stability, wide band line terminations and attenuators. The two existing applications represent the two limits of use of metal barriers. That is, a metal barrier so thick that virtually infinite attenuation is achieved at high frequencies, and a metal film so thin that the alternating current resistance is virtually constant over a wide band of frequencies. The immediate invention employs the intrinsic low-pass characteristics of a metal barrier in a filter application, which characteristics have been generally accepted as a disadvantage in conventional applications.

Obviously, many modifications and variations of the present invention are possible in light of the above teachings. It is, therefore, to be understood that within the scope of the appended claims the invention may be practiced otherwise than is specifically described.

What is claimed and desired to be secured by Letters Patent of the United States is:

1. An attenuator for providing protection against spurious energies comprising an insulated wire, an outer shield comprising a silver plated brass cap, a silver plated end plate for said cap, an aperture in said end plate, and a silver plated brass collar for insertion into said end plate, and a shielding enclosure having an elongated metal barrier comprising elongated iron tube means, said metal barrier having two direct conductive connections to said wire and one direct conductive connection to said outer shield for attenuating radio frequency power to a negligible level without appreciably attenuating D.C. and low frequencies.

2. An attenuator as claimed in claim 1 where said attenuator additionally comprises an anti-resonance capacitor connected from said wire to said outer shield whereby anti-resonance occurs within the pass-band.

3. A miniature low-pass attenuator comprising an insulated wire, a central spindle suitably threaded at each end thereof, a central disc attached externally but to the linear center of said spindle and having an aperture therein, a collar in said aperture having an outer diameter suitable to cause an interference fit therein, a shielding enclosure having an elongated iron tube having an outer diameter approximately equal to the inner diameter of said collar and being threaded on said wire, a short circuit connection to said wire at each end of said elongated iron tube thereby forming a coaxial line, a connection externally but at approximately the linear center of said elongated tube between said elongated tube and said collar, a first retaining disc on said spindle between one extremity of said spindle and a first side of said central disc, a second retaining disc between the opposite extremity of said spindle and a second side of said central disc, half of said coaxial wire being wound on said spindle between the first retaining disc and said first side of said central disc, the other half of the coaxial wire being wound on said spindle between said second retaining disc and said second side of said central disc, a first end cap having a first cylindrical portion, a first end plate over one end of said first cylindrical portion, a first aperture in the center of said first end plate for insertion of said end cap on said spindle thereby causing communicating juxtaposition of said internal surface of said first end plate and said first retaining disc and of the open end of said first cylindrical portion and said first side of said central disc, and a second aperture at the periphery of said first end plate for entry therethrough of said input wire, a second end cap having a second cylindrical portion, a second end plate over one end of said second cylindrical portion, a third aperture in the center of said second end plate for insertion of said end cap on said spindle thereby causing communicating juxtaposition of the internal surface of said second end plate and said second retaining disc and of the open end of said second cylindrical portion and said second side of said central disc, and a fourth aperture at the periphery of said second end plate for exit therethrough of said output from the attenuator, and threadable means for engagement with both threaded extremities of said spindle to securely fasten said radio-frequency interference guard into a compact separate unit.

4. A miniature low-pass attenuator as claimed in claim 3 wherein said central disc, collar, and said first and second end caps are of silver plated brass.

5. In a filtering device for providing protection in electrical and electronic circuits against spurious high frequency energies, the combination comprising a first conductor composed of a high-conductivity material and having input and output terminals, a second conductor composed of a magnetic material having input and output terminals, said second conductor having a longitudinal bore through which said first conductor extends, said second conductor having a wall thickness determined by the expression for skin depth $\delta = \sqrt{(\pi\mu\sigma)^{-1}}\sqrt{f^{-1}}$ where $\mu$ is initial permeability of the material, $\sigma$ is the conductivity of the material and $f$ is the cut-off frequency of the filter, said first and second conductors being shorted together at least one of the two pairs of corresponding terminals, a hollow container composed of a non-magnetic, high-conductivity material situated such that said container substantially surrounds said first and second conductors to act as a high-frequency electromagnetic shield, and said container being electrically shorted at one position to said second conductor.

6. A filtering device as in claim 5 further comprising: an anti-resonance capacitor connected between said first conductor and said container.

7. In a filtering device for providing protection in electrical and electronic circuits against spurious high-frequency energies, the combination comprising an insulated conductor having input and output terminals, a hollow conductor concentric and co-extensive with and exterior to said insulated conductor and having input and output terminals, said insulated and hollow conductors being physically shorted together at their corresponding terminal pairs, a hollow container composed of a non-magnetic, high-conductivity material situated such that said container substantially surrounds said hollow conductor and is concentric and co-extensive with said hollow conductor, said container being electrically shorted to said hollow conductor at one position, whereby said container acts as an electromagnetic shield to high frequency radiation emanating from said hollow conductor, and an anti-resonance capacitor connected between said insulated conductor and said container.

8. An attenuator for providing protection against spurious radio frequency induced by external electromagnetic and electrostatic fields comprising an insulated wire for conducting and passing any D.C. or low frequency energy directly through said attenuator, a shielding enclosure for conducting any radio frequency energy on said wire away from said wire comprising elongated iron tube means enclosing said wire having two direct conductive connections at the extremities of said iron tube means to said wire whereby the skin depth thickness of said iron tube means determines the amount of conduction of radio frequency energy away from said wire, and the length of said iron tube means determines the D.C. shunt resistance for any D.C. or low frequency energy on said wire and prevents said D.C. or low frequency energy from being carried by said iron tube means, a conductive and non-magnetic shell providing an electromagnetic outer shield surrounding said iron tube means having one direct conductive connection to said iron tube means between said two direct conductive connections for protecting said iron tube means and said wire from any incident radio frequency energy and further dissipating any radio frequency energy on said iron tube means through said one direct conductive connection whereby any D.C. or low frequency energy applied to said wire passes directly through said attenuator on said wire and any spurious radio frequency energy is attenuated or dissipated and prevented from passing through said attenuator.

9. An attenuator as claimed in claim 8 wherein said iron tube means has an exterior insulated surface, said wire and said enclosing elongated iron tube means being coiled between said two direct conductive connections whereby said insulated surface provides D.C. insulation between adjacent coils of said tube means.

References Cited by the Examiner

UNITED STATES PATENTS

| | | | |
|---|---|---|---|
| 730,246 | 6/1903 | De Forest | 333—73 |
| 2,030,178 | 2/1936 | Potter | 333—73 |
| 2,183,123 | 12/1939 | Mason | 333—73 |
| 2,220,922 | 11/1940 | Trevor | 333—73 |
| 2,239,905 | 4/1941 | Trevor | 333—73 |
| 2,392,664 | 1/1946 | Gurewitsch | 333—73 |
| 2,456,803 | 12/1948 | Wheeler | 333—73 |
| 3,108,238 | 10/1963 | McHenry | 333—81 |

HERMAN KARL SAALBACH, *Primary Examiner.*

C. BARAFF, *Assistant Examiner.*